United States Patent Office 3,424,916
Patented Jan. 28, 1969

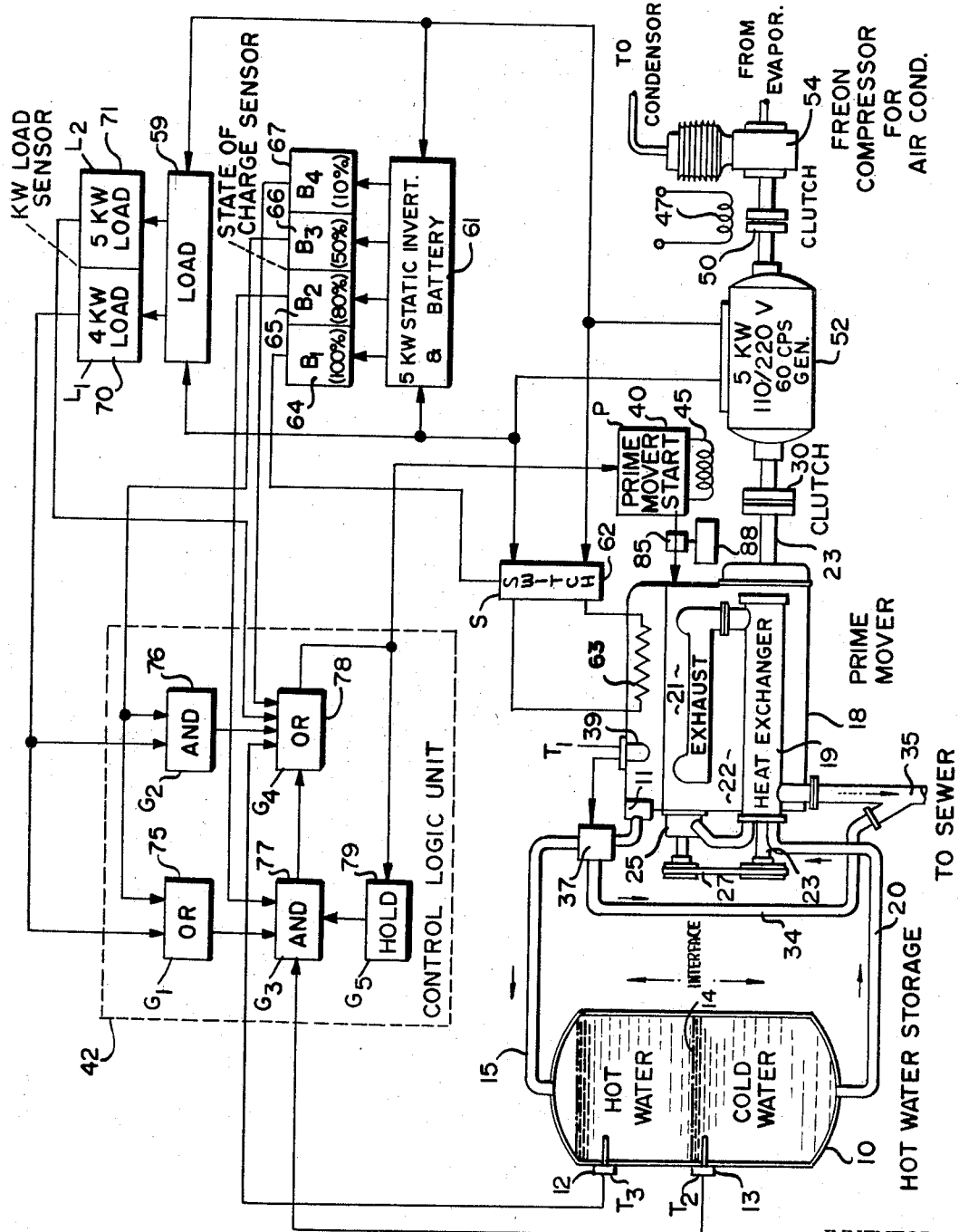

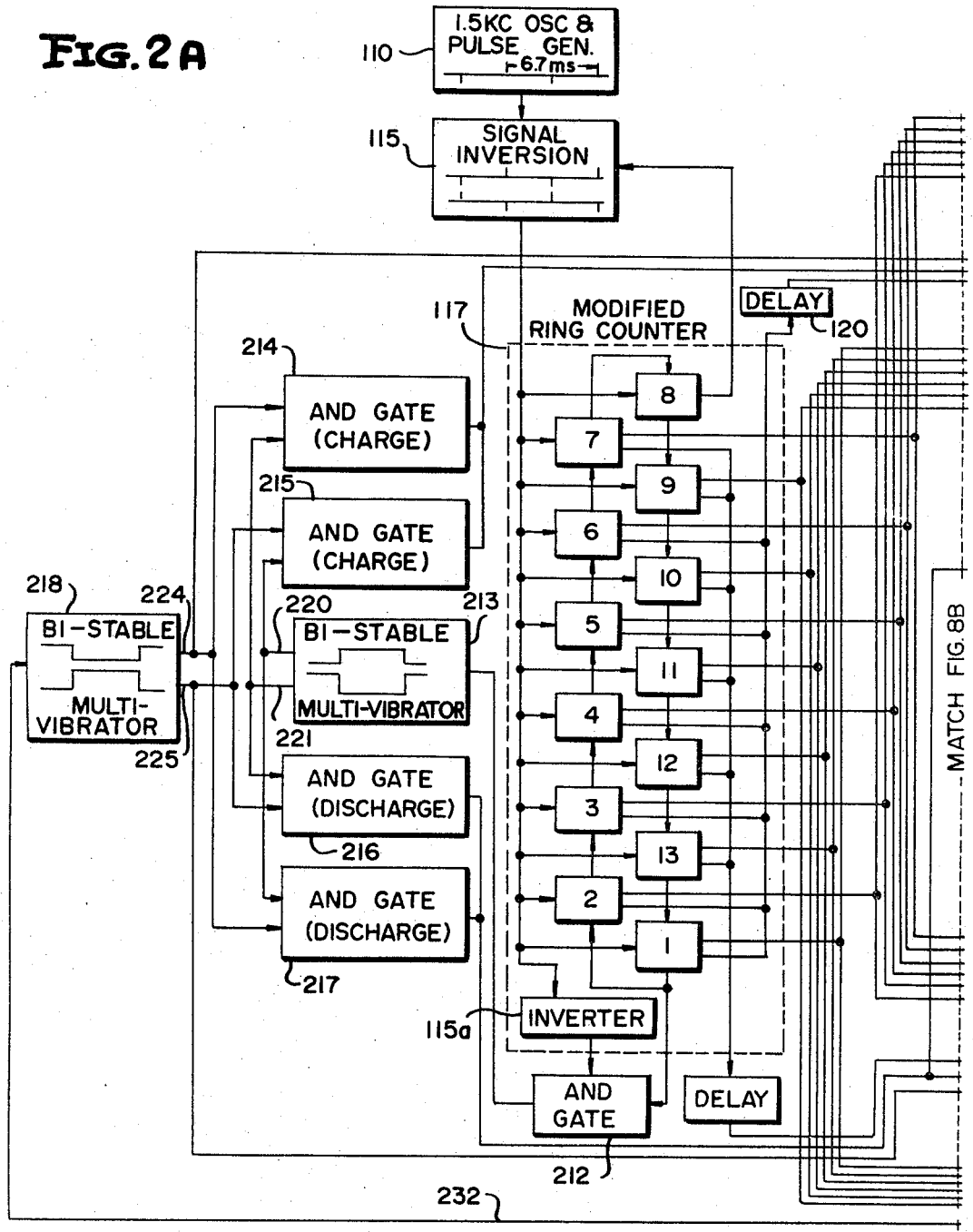

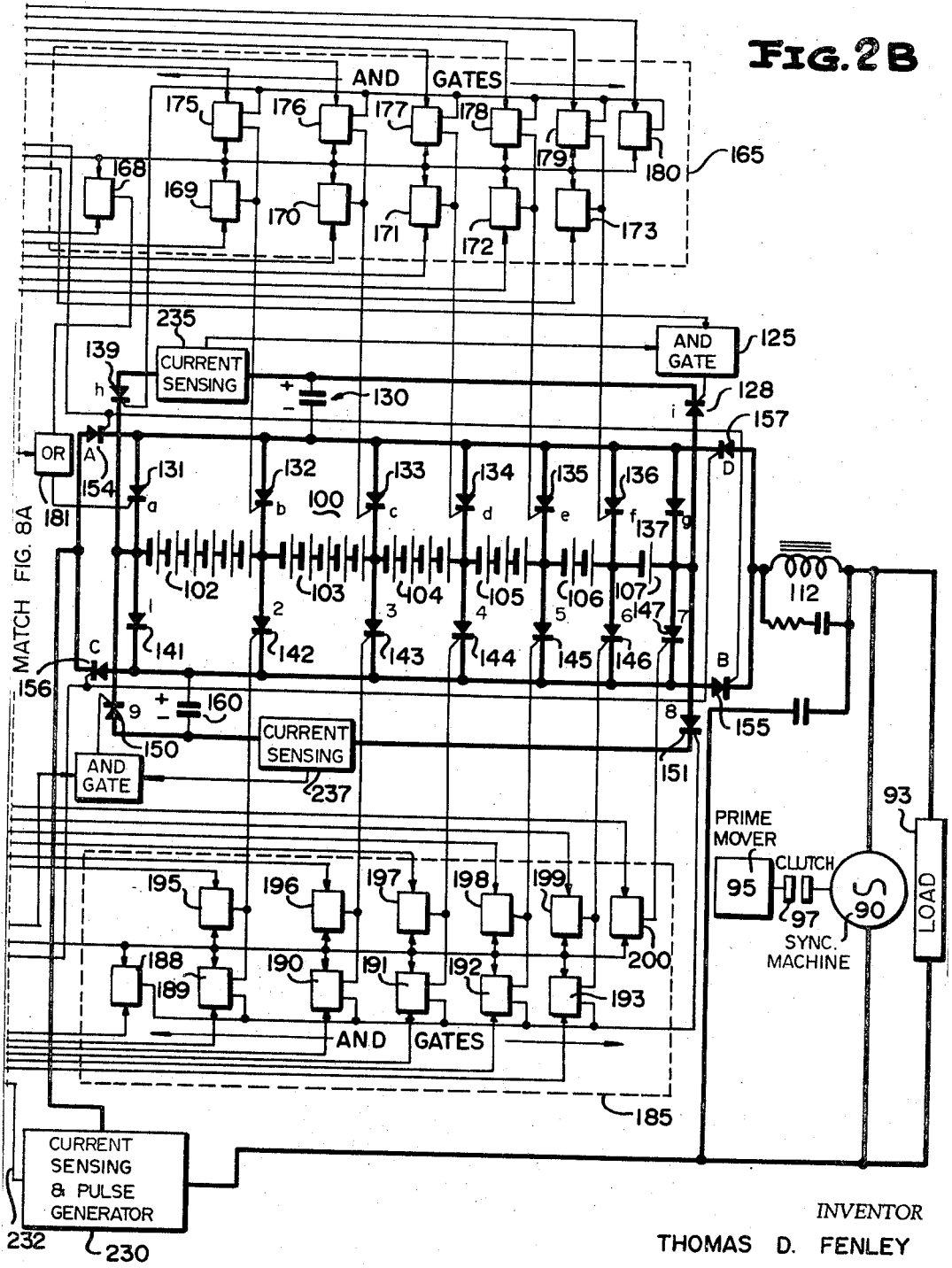

3,424,916
TOTAL ENERGY SYSTEM
Thomas D. Fenley, Box 370A, R.D. 1,
Hightstown, N.J. 08520
Filed July 15, 1966, Ser. No. 565,491
U.S. Cl. 290—40                                     7 Claims
Int. Cl. H02j 7/04; F02n 11/06

The present invention relates generally to total energy systems and, more particularly, to systems capable of storing and generating energy for residential and industrial use to supply on-site requirements of electricity, heat, air conditioning and hot water.

In the past, total energy systems have usually been employed at home, industrial and public facility sites only in those cases where commercial power was unavailable, such as in rural areas or other locations so remote from commercial or public utility power plants and substations that access to power lines was not feasible. In other words, the total energy system has been primarily utilized as a matter of necessity rather than of economy. Recently, however, it has been found that on-site total energy systems can provide, and are providing, substantial savings in power generation operation costs even where commercial power sources are available. For example, a high school in McAllen, Tex., has reported (Business Week, June 13, 1964, page 80) an annual savings of about $40,000 against the cost of purchasing commercial power by use of an on-site power generating system. Proportionate reductions in operating costs are available for other establishments or facilities, including single family dwellings, provided that the total energy system to be utilized is practical, efficient and reliable and that, in addition to a consideration of such factors as local fuel and electric power costs, there exists a predictable and stable demand for heat and electric power. The latter consideration may alternatively be stated as a requirement of the absence of substantial variations (i.e. power surges) in either the heating requirement or the electrical load of the establishment of interest. Where the instantaneous load varies by a factor of less than approximately ten percent from the average load, and other factors are favorable, an on-site total energy system may well be desirable from the standpoint of economy. However, for those situations in which a substantially constant load is not presented to the system, or where the average load is considerably less than the peak load, the total energy system operating costs will probably exceed the cost of purchasing local power, since it is apparent that any electrical generating system must have a capacity at least equal to the maximum load expected and that unused available capacity results in inefficient operation.

As a consequence, it has not been deemed practical to utilize existing total energy systems for such establishments as single family dwellings because the peak or surge load is often greater than ten times the average load at such sites. The duration of the peak load may be and usually is only a few minutes (seldom exceeding fifteen minutes) because the average electric load for a typical single family dwelling in a twenty-four hour period is less than one kilowatt.

Accordingly, it is a principal object of the present invention to provide a total energy system which is efficient, reliable and practical for single family dwelling use as well as for use at multi-family dwellings, public facilities, and industrial locations.

The basic features of total energy systems in accordance with the present invention include the provision of an electrical generator for supplying power outputs considerably less than the surge load demands, a static inverter and storage battery unit operative in conjunction with the undersized electrical generator to supply peak load requirements, an internal combustion engine operating on the principle of increased volume expansion without alteration of geometric compression ratio, and a variable duty cycle logic control unit for adjustment of the system in accordance with changing load conditions in place of conventional throttling of the internal combustion engine.

In my co-pending application for United States Letters Patent, Ser. No. 547,328, filed May 3, 1966, and entitled, "Static Inverter," I have disclosed a solid state static inverter for converting A.C. to D.C. or D.C. to A.C. without a requirement of rotating machinery as utilized in conventional converters. The present total energy system preferably includes that solid state static inverter to improve system efficiency and reliability and to reduce operating costs. Briefly, the static inverter disclosed in my co-pending application is utilized for selectively charging and discharging, a plurality of series-connected batteries, as required, to store and deliver electrical power, respectively, and includes a battery charging circuit comprising a first plurality of normally non-conductive uni-directional current switches, means coupling each of the switches to distinct and different groups of the series-connected batteries and to the power source, and means for selectively and sequentially rendering each of the switches conductive to apply charging current in the form of a staircase waveform from the power source to the respective groups of batteries, each step of the staircase supplying energy to a different group of batteries; and a battery discharge circuit comprising a second plurality of normally non-conductive unidirectional current switches, means coupling each of the second plurality of switches to distanct and different groups of the series-connected batteries and to the load, and further means for selectively and sequentially rendering each of the second plurality of the switches conductive to apply step voltages in a staircase waveform from the batteries to the load. In this manner, an A.C. waveform is converted to D.C. for charging the batteries, and the D.C. voltage stored in the batteries subsequently converted to A.C. for supplying household or on-site power.

Accordingly, it is another object of the present invention to provide a total energy system for supplying on-site requirements of electrical power, heat, air conditioning, and hot water for single family dwellings, multi-family dwellings, public facilities, and industrial or business facilities, wherein the total energy system includes a solid state static inverter for converting D.C. voltages obtained from a plurality of series-connected storage batteries to an A.C. voltage having a frequency suitable for energizing the load presented to the system and for converting the A.C. voltage available from an A.C. generator to supply D.C. charging current to the batteries.

Briefly, according to the present invention, the total energy system is adapted to operate in conjunction with existing air conditioning, heating and water storage units at the facility or establishment in which the system is to be installed, and to supply the electrical power requirements of the load presented by the facility, the system including a prime mover; an A.C. generator; a static inverter of the type briefly described above; a plurality of storage batteries connected to the inverter to receive D.C. charging current therefrom and to supply stored D.C. voltages thereto for conversion to an A.C. voltage; means connecting the generator, inverter and load in parallel circuit so that the A.C. output of the generator is applied to the inverter to charge the batteries, and to the load, and the A.C. voltage derived by the inverter from the storage batteries is supplied to the load during peak power requirements and periods when the generator is not driven by the prime mover; a plurality of sensors for detecting level of charge on the storage batteries, power demand of the load, and temperature of water contained in the water storage unit, each sensor being adapted to generate a voltage indicative of the respective detected parameter; means for starting the prime mover and for controlling the supply of fuel thereto; drive means for selectively coupling the generator to the prime mover for application of driving power to the generator during operation of the prime mover; a conduit system for carrying hot and cold water to and from the water storage unit; means in the conduit system for pumping the water carried thereby; means for transferring heat resulting from the operation of the prime mover to water flowing through the conduit system; and a logic circuit responsive to voltages generated by the sensors for controlling the operation of the prime mover.

It is therefore a further object of the invention to provide a total energy system including a prime mover for driving an electrical generator of the system, and a logic circuit responsive to voltages accompanying changing demands of the load on the system for controlling the operation of the prime mover.

Still another object of the invention is to provide a total energy system for supplying on-site heat, air conditioning, hot water, and electrical load requirements, wherein the system includes means for storing heat and electrical energy and for supplying the stored energy along with energy generated by other system components in variable quantities to meet the demands of the establishment in which the system is installed.

The above and still further objects, features and advantages of the invention, will become apparent from a consideration of the following detailed description of a preferred embodiment thereof, especially when taken in conjunction with the accompanying drawings, in which:

FIGURE 1 is a schematic diagram, partly electrical and partly mechanical, of the overall total energy system; and FIGURES 2a and 2b constitute a circuit diagram of a preferred embodiment of the static inverter for the system of FIGURE 1.

Referring now to the drawings and, more specifically, to FIGURE 1 thereof, an existing hot water storage tank 10, preferably glass-lined, insulated and having a capacity of approximately eighty gallons, is provided with a pair of temperature sensors 12 and 13 positioned in the wall of the tank at points defining approximately 10 percent and 50 percent, respectively, of the volume measured from the top of the tank. Each sensor is arranged with its temperature sensing elements in contact with the water in the tank at the above-mentioned points and is calibrated to generate a voltage of preselected polarity when the water temperature at that point reaches a predetermined value. Each sensor may be a thermostat or thermo-electric transducer of any conventional type and is preferably designed to generate a positive voltage or a negative voltage depending respectively upon whether the water temperature at that point is less than or greater than 160° F. As is well known, an interface or layer, e.g. 14, exists in the tank between water of any two given temperatures. For the sake of convenience, the temperature of the layer 14 is arbitrarily assumed to have a temperature of 160° F., and the water above that layer, i.e. of higher temperature, will be referred to as hot" water while the body of water below that layer, i.e. of lower temperature, will be termed "cold" water. It will, of course, be apparent that layer 14, defining the boundary between hot and cold water in the tank, may be of any preselected temperature at which the voltage generated by sensors 12 and 13 is desired to change polarity. As the quantity of hot water stored in tank 10 increases or decreases, interface 14 moves downwardly or upwardly in the tank, respectively. Hence, the polarity of the voltage generated by each sensor is indicative of the quantity of stored hot water in terms of a percentage of total volume. For the sake of example, sensor 12 will switch from negative to positive output when interface 14 rises above the location of that sensor indicating a "hot" water storage of less than 10 percent of the total tank volume, whereas the same change occurring in the output of sensor 13 indicates a hot water storage of less than 50 percent total volume. It will be observed that these percentages may be varied depending upon the specific location of each sensor.

The supply of hot water in the tank is replenished, according to the hot water requirement and usage of the facility in which the tank is located, by water flowing into the top of the tank through pipe or conduit 15, this water having been heated upon passage through the water jacket 21 of internal combustion engine (prime mover) 18 and through a conventional heat exchanger 19 which transfers heat from the exhaust gases of the engine to the water flowing through cold water return pipe or conduit 20.

A hot water thermostat 11, of the type conventionally used in automobile engines, is set to open at a water temperature of 185° F. It acts to shut off the flow of water against the head created by pump 25 when the jacket water temperature is below 185° F. and to open a sufficient amount at 185° F. to maintain effluent water at that temperature.

Internal combustion engine 18 is preferably designed to operate on the principle of increasing volumetric expansion without alteration of geometric compression ratio, to perform under constant load and constant r.p.m. Suitable engines of this type are marketed under the name "Worthington's Mainliner Series" and have typical operating efficiencies of approximately 31 percent. The engine, which is supplied with appropriate fuel in any conventional manner, is utilized when operating to rotate shaft 23 at constant speed (i.e. constant r.p.m.), the shaft in turn driving a pump 25 via a conventional belt or gear drive arrangement 27 and being coupled to one side of an electromagnetic clutch assembly 30.

Pump 25 is used to produce a pressure head for water flow through water jacket 21 and back out into conduit 15 to hot water tank 10 or through conduit 34 leading into sewer exhaust or soil pipe 35. The flow of water through either of pipes 15 or 34 is governed by an electrically operated valve 37, controlled in accordance with the output of a further temperature sensor (thermo-electric transducer) 39 positioned to detect the temperature of the water in the water jacket 21 of engine 18. Sensor 39 may, like sensors 12 and 13, be of the conventional thermostat type, and is arranged and adapted to transmit a voltage of polarity indicative of water temperature relative to a predetermined reference temperature. The sensor is preferably set to switch from negative to positive output when the water temperature in proximity to the sensing element exceeds 200° F. Below that temperature, the negative voltage maintains the valve open between pump 25 and pipe 15 so that hot water flows from the water jacket of the engine and from heat exchanger 19 through hot water replenishment pipe 15, whereas for jacket water temperature in excess of 200° F., the positive output of the sensor switches valve 37 to close the flow path between pump 25 and pipe 15 and to open a path through conduit 34 and thence to the existing sewer pipe 35.

The starting and stopping of prime mover 18 is accomplished by a switch 40 which operates under the control of voltages applied thereto from logic unit 42. To this end, the switch is connected to the ignition system (not shown) of the engine for appropriate energization and de-energization thereof. In addition, switch 40 is utilized to supply control current to winding 45 of electromagnetic clutch unit 30. When the clutch unit is operated, the generator 52, which is rotating continuosly, starts the prime mover which then supplies driving power to the A.C. generator 52.

The alternating current generator is preferably of conventional 110/220 volts A.C. single phase type, having a rotating field with damper windings and a power rating of perhaps less than half the peak load demand.

A second electromagnetic clutch unit 50 has its operating winding 47 connected to receive currents in accordance with the operation of a wall-mounted thermostat (not shown) so that conventional Freon compressor 54 is also driven by the prime mover to provide air conditioning, as required, in the establishment in which the system is installed. The compressor is provided with conduits for supplying compressed Freon to the air conditioning unit condensor and for return from the evaporator.

The output terminals of A.C. generator 52 are connected in parallel circuit with the electrical load 59 presented to the total energy system by the establishment, with static inverter and storage battery unit 61, preferably of 5 kilowatt rating, and with switch 62 which may be selectively operated to pass or to cut off current to a resistance heating element 63 within water jacket 21 of internal combustion engine 18.

A plurality of conventional voltage or state-of-charge sensing elements 64–67 are employed to detect the instantaneous charge on the storage batteries in unit 61, each of these sensors preferably being set to respond to a different percentage of full charge for supplying an output voltage representative of the detected level of charge in the batteries. The sensor output voltages are applied to logic circuits in control logic unit 42 or to switch 62. Each of sensors 64, 65, 66 and 67 may, for example, be a conventional active switch element biased to produce a positive or a negative voltage output when the storage battery voltage is less than or greater than a predetermined percentage of full voltage capacity. For purposes of illustration, sensor 64 supplies control voltages of positive or negative polarity to switch 62 when the batteries are fully charged or have less than full charge, respectively; and remaining charge sensors 65, 66 and 67 generate positive or negative output voltages for application to control logic unit 42 when the level of charge of the batteries is less than or greater than 80 percent, 50 percent and 10 percent of full charge, respectively.

Power sensors 70 and 71, such as conventional demand meters, are connected to electrical load 59 in order to provide information in the form of bi-polar control voltages to logic unit 42 as to whether or not the electrical requirements of the load exceed the rating of static inverter and storage battery unit 61. Sensor 70 transmits a positive voltage for a load requirement exceeding 4 kw. and a negative voltage for load demand less than 4 kw. Sensor 71 operates in the same manner except that its reference level is set at 5 kw.

The control logic unit 42 includes an OR gate 75, connected to receive as inputs the voltages generated by power sensor 70 and charge sensor 66; an AND gate 76, connected to receive as inputs voltages generated by power sensor 70 and voltage sensor 66; a further AND gate 77, connected to receive inputs from temperature senor 13, OR gate 75, voltage sensor 65, and hold circuit 79; another OR gate 78, connected to receive inputs from voltage sensor 67, power sensor 71, AND gate 76, temperature sensor 12, and AND gate 77; and hold circuit 79, connected to receive in parallel with start-stop switch 40 the output of OR gate 78.

The control parameters for the various sensors, switches, valves and logic circuits are summarized in the table below.

TABLE OF OPERATION

| Component | Function | For— |
|---|---|---|
| Temperature sensor 12 | Generates (+) | Temperature <160° F. |
|  | Generates (−) | Temperature >160° F. |
| Temperature sensor 13 | Generates (+) | Temperature <160° F. |
|  | Generates (−) | Temperature >160° F. |
| Temperature sensor 39 | Generates (+) | Temperature >200° F. |
|  | Generates (−) | Temperature <200° F. |
| Charge sensor 64 | Generates (+) | Battery charge =100% |
|  | Generates (−) | Battery charge <100% |
| Charge sensor 65 | Generates (+) | Battery charge <80% |
|  | Generates (−) | Battery charge >80% |
| Charge sensor 66 | Generates (+) | Battery charge <50% |
|  | Generates (−) | Battery charge >50% |
| Charge sensor 67 | Generates (+) | Battery charge <10% |
|  | Generates (−) | Battery charge >10% |
| Valve 37 | Open to pipe 15 | (−) From sensor 39. |
|  | Open to pipe 34 | (+) From sensor 39. |
| Switch 62 | Passes current | (+) From sensor 64. |
|  | Cuts off current | (−) From sensor 64. |
| Power sensor 70 | Generates (+) | Load >4 kw. |
|  | Generates (−) | Load <4 kw. |
| Power sensor 71 | Generates (+) | Load >5 kw. |
|  | Generates (−) | Load <5 kw. |
| Gates 75, 78, 79 | Generates (+) | Any (+) input. |
|  | Generates (−) | All (−) inputs. |
| Gates 76, 77 | Generates (+) | All (+) inputs. |
|  | Generates (−) | Any (−) input. |

In the operation of the total energy system of FIGURE 1, it will be apparent from a consideration of the above table and the internal circuitry of control logic unit 42, that the following conditions are effective to control the operation of prime mover engine 18:

(1) If either the amount of hot water stored in tank 10 is less than the minimum acceptable level (as determined by the position of temperature sensor 12) 10 percent of capacity in this example, or the charge on the storage batteries is below the minimum acceptable level (as determined by sensor 67), 10 percent of full charge in this example, engine 18 is started irrespective of the state or level of the other storage. That is, sensor 12 is operative to supply a positive voltage to OR gate 78 if interface 14 (at a temperature level of approximately 160° F.) is positioned above the sensing element of that sensor. Similarly, if the charge on the storage batteries falls to a level of 10 percent of full charge as detected by charge sensor 67, the latter is operative to supply positive voltage to OR gate 78. It will be apparent that the application of either or both of these voltages to OR gate 78 will result in an output from the gate to actuate the prime mover start switch 40. Upon receipt of this actuating voltage, start switch 40 energizes electrically operated valve 85 from a closed to an open position so that fuel from tank 88 is supplied to the prime mover, and further energizes the ignition system for the prime mover. The start switch also supplies current to winding 45 to operate electromagnetic clutch unit 30 thus causing the engine to start and drive A.C. generator 52.

(2) If the electrical load demand is, at any given moment, greater than the rating of the static inverter, engine 18 will be started regardless of the state of either hot water storage or charge stored by the batteries. This is accomplished by appropriate voltage output of power sensor 71, the sensor generating a positive voltage upon detection of load demand greater than 5 kilowatts. The voltage is applied to OR gate 78 which again is operative to supply an output whether or not input voltages are applied at any of the other of its input terminals, thus actuating prime mover start switch 40.

(3) If the power demand of load 59 is near the rated capacity of static inverter unit 61, 4 kilowatts in this example, and the charge stored on the batteries is below approximately 50 percent of full charge, engine 18 will be started irrespective of the state of hot water storage, positive voltages being supplied to AND gate 76 by each of sensors 70 and 66, respectively. In that event, AND gate 76 is operative to supply an input to OR gate 78 so that an energizing voltage is applied to prime mover start switch 40. Simultaneously therewith, inputs are also supplied to both input terminals of OR gate 75, so that an input voltage is fed to AND gate 77 by the OR gate. However, unless input voltages are also applied to each of the other input terminals of the latter AND gate, that gate will, of course, be ineffective to supply a voltage to the appropriate input terminal of OR gate 78.

(4) Once prime mover 18 has started for any of the conditions numbered (1), (2), (3) above, it will continue to run provided:

(a) The amount of hot water stored in tank 10 is less than approximately 50 percent of the storage tank capacity and the charge stored on the battery in unit 61 is less than 50 percent of full charge. That the prime mover continues to operate under these conditions will be apparent from a consideration of the state of the pertinent sensors. Note that temperature sensor 13 and charge sensors 65 and 66 supply positive inputs to AND gate 77 (sensor 66 through OR gate 75). Immediately prior thereto, either or both of sensors 13 and 67 (condition 1) and/or sensor 71 (condition 2), or sensors 66 and 70 (condiion 3) generated positive outputs such that OR gate 78 is open and hold circuit 79 has been operated to supply an input to AND gate 77. It will be observed, therefore, that all inputs to AND gate 77 are active and that OR gate 78 will consequently continue to supply operaing voltage to switch 40;

(b) Hot water storage is less than 50 percent of the capacity of tank 10 and the charge on the storage batteries of unit 51 is less than 80 percent but more than 50 percent of full charge during a period in which the load demand is greater than four kilowatts but less than 5 kilowatts. Under these conditions, temperature sensor 13, charge sensor 65, power sensor 70, and hold circuit 79 (the latter in accordance with the pre-existing voltages generated by the sensors under conditions 1, 2 and/or 3) generate positive voltages as inputs to AND gate 77 (sensor 70 through OR gate 75) which therefore maintains an input to OR gate 78, and thus an energizing voltage to switch 40.

(5) If electrical energy is being generated by A.C. generator 52 because of a condition of low hot water storage (less than 10 percent) in tank 10, and the storage batteries in unit 61 are already charged to a state of 100 percent capacity, the excess electrical energy so generated is diverted to 5 kilowatt heating element 65. To this end, switch 62 is operated by sensor 64, responsive to the condition of 100 percent charge on storage batteries in unit 61. Hence, the excess electrical energy generated by A.C. generator 52 is utilized to heat the water in jacket 21 of prime mover 18. The water so heated is pumped into storage tank 10 through valve 37 and conduit 15 by pump 25, driven by the prime mover. Of course, this condition (i.e. condition 5) results in starting of the prime mover because of the initial operation of temperature sensor 12.

(6) If, because of low storage of electrical energy (less than 10 percent) in the storage batteries of unit 61, or a sustained load in excess of 5 kilowatts, excessive hot water is being stored in tank 10 or the temperature of the water exceeds a maximum permissible level (e.g., greater than 200° F.), the flow of hot water is diverted to sewer pipe or exhaust conduit 35 via pipe 34. This is accomplished by actuation of valve 37 under the control exercised by temperature sensor 39. It will be apparent in this instance that the prime mover has been started by the operation of charge sensor 67, which is responsive to less than 10 percent of full charge on storage batteries in unit 61, or load sensor 71, which is responsive to a load in excess of the rating of the static inverter. The excessive heating of the water in such a case is the result of capturing heat in the water jacket and exhaust during operation of engine 18. The excess hot water is thereafter transferred to sewer pipe 35.

From the foregoing description of operation, it will be apparent that prime mover 18 is provided with complete on-off control for all normal conditions. It will further be observed that the operation of control logic unit 42 is based in part upon the principle that generation of excessive electrical energy (i.e. greater than 100 percent charge on the storage batteries) because of a condition of low hot water storage need not result in wasted power since the additional energy may be converted to heat (via heating element 63) to more rapidly produce the required hot water; but that the converse is not true; that is, the generation of excess hot water to satisfy a condition of low electric storage capacity will result in wasted energy because the heat produced cannot easily be converted into electrical energy. Operation of the control logic unit in conjunction with the operation of the various sensors of the energy system is effective to start prime mover 18 whenever energy storage is below the predetermined minimum acceptable level in either hot water storage tank 10 or the storage batteries of unit 61; and the prime mover will continue to operate until the amount of hot water in the tank exceeds 50 percent of the storage tank capacity, or until the charge on the storage batteries is up to approximately 80 percent of full charge, in accordance with the above-listed conditions.

No mention has thus far been made of such factors as override control safety devices, for such exigencies as loss of oil pressure, overheating, or other factors, but it will be apparent that the inclusion of necessary safety devices and their implementation constitute purely conventional applications and will be apparent to those of ordinary skill in the pertinent art. It should be emphasized, in addition, that the control parameters mentioned above in connection with operation of the various sensors of the system have been assigned values herein purely for the sake of example and clarity and that those values may be adjusted up or down as may be required to improve overall efficiency.

Reference is now made to Figures 2a and 2b wherein is shown the circuit diagram of a preferred embodiment of static inverter and battery unit 61 for the total energy system. Figures 2a and 2b are substantially identical to Figures 8a and 8b of my above-mentioned co-pending application Ser. No. 547,328, and are repeated herein solely for the purpose of convenient reference. Since operation of the inverter is set forth in detail in the co-pending application, a brief description of that operation is sufficient for present purposes.

Prime mover 95, clutch unit 97, synchronous machine 90 and load 93 correspond respectively to internal combustion engine 18, clutch unit 30, A.C. generator 52, and load 59 of FIGURE 1. The synchronous machine 90 rotates at synchronous speed at all times and when the clutch is engaged, the prime mover starts and drives generator 90 so that electrical power is supplied to load 93 as well as to a set, 100, of series connected storage batteries 102–107; on the other hand, when the clutch 97 is disengaged, the storage battery set 100 supplies all the electrical power to the load and to the synchronous machine which rotates without load. The 1.5 kc. oscillator-pulse generator 110 is utilized to time the trigger pulses so as to provide the fundamental 60 c.p.s. frequency required by the load, with six steps (the number of steps being determined by the number of storage batteries) to each quarter of the sinusoid. Parallel resonant circuit 112 is placed in series between the static inverter and battery combination and the parallel connected generator 90 and load 93 in order to filter the 1.5 kc. staircase harmonic from the power supplied to the load during discharge, and to generate a staircase waveform from generator 90 sinusoid during charge. Pulse generator 110 is preferably of high stability since it determines the accuracy of frequency stability of the entire apparatus irrespective of whether or not prime mover 95 is driving the generator to charge battery 100. The output of pulse generator 110 is applied to a signal inversion circuit 115 which may include a single stage unity gain amplifier selectively switched in or out of the inversion circuit according to the state of a bistable multivibrator (flip-flop, not shown) also included in inversion circuit 115. The multivibrator is alternately switched from one stable state to the other by successive positive pulses emanating from stage 8 of a substantially conventional ring counter 117. The purpose of stage 8 and the switching is to permit the passage of two positive pulses in successive (one-half cycle apart) by signal inversion circuit 115, which will provide an extra half timing period for the positive and negative peak voltage step. This is necessary to prevent a 180° phase shift in the 1.5 kc. voltage impressed across filter 112 which would otherwise accompany reversal in direction of the staircase.

Ring counter circuit 117 is comprised of thirteen stages which complete and close the ring, each stage being identical to the other stages, except that stage 1 is arranged to be energized to the "on" condition when power is first turned on while the other stages remain in the "off" condition and stage 8 has only one output while the remaining stages each have a pair of outputs. All stages of the ring counter circuit are connected to receive pulses simultaneously from signal inversion circuit 115. The pulses alternate in polarity at the prescribed frequency except at those times when the staircase waveform reaches peak voltage, either positive or negative, in which case two positive pulses are supplied in succession one-half cycle apart by signal inverter 115. Each stage of the ring counter is responsive only to positive pulses from the signal inversion circuit to assume the "off" condition; that is, each stage will remain in the "on" condition until it receives a positive pulse from the signal inverter at which time it will revert to the "off" condition. Of course, the ring counter is arranged so that only one stage is "on" at a time; when that stage is turned off, upon receipt of a positive pulse from the signal inverter 115, it provides a trigger pulse to the next succesive stage to turn that stage on. When any stage of the counter is turned on, it transmits at each of its two outputs a positive pulse, and as will be observed from the figure, one of the positive output pulses of each of stages 1–6 inclusive is supplied to a delay circuit 120 and thence to an AND gate 125 whose output is used to trigger SCR 128 to charge capacitor 130 in the battery charge circuit. The delay is necessary in both the charge circuit and the discharge circuit to insure that the capacitor has completely discharged before attempting to charge it again.

The battery charge circuit includes SCR's 128, 132–137 and 139 and capacitor 130.

The battery discharge circuit or staircase voltage generator includes SCR's 142–147, SCR's 150 and 151 and capacitor 160.

Main rectifying SCR's 154–157 are operative to provide the polarity reversal through the load.

SCR's 131 and 141 are required to isolate the charge and discharge circuits from each other.

One output of each of stages 7 and 9–13 of ring counter 117 is employed to trigger SCR 150 in the battery discharge circuit through a delay identical to 120. The other output pulse of all ring counter stages except stage 8 is a sustained positive pulse which is on as long as the stage is on and is utilized to trigger the battery charge SCR's 131–137 and 139 or the battery discharge SCR's 141–147 and 151. It will be observed that, although SCR's are specified for elements 141 and 137, these elements may be conventional diodes, as shown, if desired.

The trigger pulses for the SCR's in the battery charge circuit are supplied by a plurality of AND gates in charge mode circuit 165, and to this end, the ring counter stages supply at least one pulse input to each of the charge mode AND gates. Output pulses from the ring counter stages are also supplied to AND gates in the discharge mode circuit 185 for the purpose of governing the triggering of the SCR's in the battery discharge circuit. For example, one output pulse from each of stages 9–13 and 1 of the ring counter is supplied to AND gates 168 through 173, respectively, in charge mode circuit 165 and simultaneously to AND gates 188 through 193, respectively, of the discharge mode circuit 185. Similarly, an output pulse from each of stages 2–7 of the ring counter circuit is supplied respectively to charge mode AND gate circuits 175–180 and to the discharge mode AND gates 195–200. It will, of course, be understood that no output pulse is generated by any of the AND gates in either of the charge mode or discharge mode circuits absent a corresponding pulse applied to the second input of the respective AND gate. The manner in which this second input is obtained will be explained presently. It will be noted, however, from the preceding discussion that ring counter 117 determines the timing and triggering sequence, and hence the instantaneous voltage output with respect to time, but it is the operation of the AND gates in the charge or the discharge mode circuits which determine whether or not a charge or a discharge SCR is to be triggered and hence a charge or a discharge current is to flow. All of the AND gates in both the charge and discharge mode circuits are identical except that gates 168–173 and 195–200 have a single output while the remaining gates have dual outputs. The first output of the latter gates is of extremely short duration regardless of sustained input pulses and is employed to trigger the capacitor discharge circuit in order to extinguish the preceding SCR as will be described while the next succeeding SCR is rendered conductive by the second output which is slightly longer in duration than the time required for the preceding SCR to be extinguished. This will become further apparent in the ensuing description of operation of the circuit.

The second input to the AND gates in charge mode circuit 165 is supplied from the output of a pair of charge AND gates 214 and 215 while the second input for the AND gates in the discharge mode circuit 185 is supplied from the output of discharge AND gates 216 and 217. The 60 c.p.s. sine wave passes through zero volt and changes polarity at zero degree, 180 degrees, 360 degrees, etc., and is always midway between 1.5 kc. steps on the staircase waveform. AND gate 212 functions to time this midpoint by generating an output pulse when it simultaneously receives a positive pulse from ring counter stage 1 and a positive pulse from signal inversion circuit 115a. The latter pulse is derived from a negative pulse generated by circuit 115 so that AND gate 212 may supply the required positive output pulse half way between the successive pulses that turn on stages 1 and 2. The output of gate 212 is applied to bistable multivibrator 213 to trigger the circuit to one or the other of its stable states. Hence, bistable multivibrator (flip-flop) 213 has one of its two outputs "on" at all times. That is, at any given instant of time a positive voltage will appear at either lead 220 or at lead 221, e.g., if a positive output pulse of flip-flop 213 is applied in parallel to charge mode AND gate 215 and to discharge mode AND gate 217 a negative output pulse on lead 221 is applied in parallel to AND gates 214 (charge) and 216 (discharge). All of AND gates 214, 215, 216 and 217 are identical and conventionally require two corresponding inputs, e.g., both "on" to provide an "on" output. The other input to these gates is supplied by a second flip-flop 218, which is operative, when triggered to one stable state, to provide a positive output on lead 224 and, when triggered to the other stable state, to provide a positive output on lead 225 in a manner similar to 213. The positive output pulse from flip-flop 218 appearing on output lead 225 is applied in parallel to AND gate 215 (charge) and to AND gate 216 (discharge) while the positive output pulse appearing at lead 224 is applied in parallel to AND gate 214 (charge) and AND gate 217 (discharge).

Since one output of bistable multivibrator 218 must be "on" at all times, in the same manner as the outputs of flip-flop 213, it follows that one and only one of AND gates 214 through 217 can have an output at any given instant of time and that at least one of those gates must have an output at all times. For example, simultaneous occurrence of a positive output on lead 220 of flip-flop 213 and a positive output on lead 225 of flip-flop 218 can result in the coincident application of corresponding inputs to only AND gate 215, both inputs being positive in this case. Hence, only AND gate 215 will provide an output pulse at that particular instant of time. Similarly, a positive output pulse on lead 220 from bistable multivibrator 213 and a positive pulse on lead 224 from bistable multivibrator 218 will result in the coincident application of input pulses to both input terminals of AND gate 217 only, resulting in the output of a pulse therefrom. It will further be noted that, if either one of flip-flops 213 or 218 changes state, then that AND gates 214–217 which is "on" must revert to the "off" condition, and a different one of the AND gates must turn "on." If, under these conditions, a charge gate is turned off then the gate which is turned on must be a discharge gate or vice versa. However, if both flip-flops 213 and 218 change state simultaneously, then the AND gates 214–217 which is "on" must revert to the "off" condition but, in this case, from one charge gate to the other charge gate or from one discharge gate to the other discharge gate. Slight consideration of the connections from the two bistable multivibrators to the four AND gates will indicate that these are the only possible switches that may occur in the AND gates for the recited changes of state of the two flip-flops.

It will also be observed that flip-flop 218 supplies trigger pulses to control the main rectifying silicon controlled rectifiers 154, 155, 156 and 157. A pulse on output lead 224 of the flip-flop will trigger SCR's 154 and 155 to the conductive state whereas a pulse on output lead 225 will trigger SCR's 156 and 157 to the conductive state. As previously stated, flip-flop 218 must have one of its outputs "on" at all times; it therefore follows that either SCR's 154 and 155 or SCR's 156 and 157, respectively, must be "on" at all times. The circuit remains in a stable condition in either state as long as current flows in that pair of the main rectifying SCR's which have been triggered by multivibrator 218. When current ceases to flow in that pair of SCR's, the absence of current is sensed by a current sensing circuit and pulse generator 230, in series with load 93 and the battery circuit. Simultaneously therewith, current sensing circuit-pulse generator 230, generates an output pulse on conductive lead 232 to switch flip-flop 218 to the other of its stable states. When this occurs, the other pair of main rectifying SCR's is turned on. For example, if current flow ceases through SCR's 154 and 155, each of that pair of rectifiers will revert to its blocking state and circuit 230 will generate an output pulse switching the "on" output of flip-flop 218 from SCR's 154 and 155 to SCR's 156 and 157. Circuit 218 remains in this stable state until current flows through the latter pair of SCR's and ultimately ceases, at which time current sensing circuit 230 generates another pulse to switch the "on" output of the flip-flop back to SCR's 154 and 155. During this sequence of events, flip-flop 213 is switched by the output of gate 212 every 1/120 of a second, or twice each cycle of 60-cycle per second voltage and entirely independent of any switching taking place in 218, so that a change in output pulse is always required from one of AND gates 214 through 217 to another of the AND gates 214–217 at least every 1/120 second. In this manner, one and only one of the AND gates in either of the charge or discharge mode circuits 165 and 185, respectively, has coincident pulses applied to both its inputs to result in an output pulse therefrom and this condition will switch from charge mode to discharge mode or vice-versa whenever 213 is switched unless accompanied by a simultaneous switch of 218.

Assume that, in a given interval of time, stage 3 of ring counter 117 is "on." This results in the application of a positive pulse to AND gate 196 in the discharge mode circuit 185 and to AND gate 176 in the charge mode circuit 165. Assume further that the latter receives a coincident input pulse from one of the two charge AND gates 214 or 215. Hence, SCR's 133 and 139 are triggered "on," the latter causing capacitor 130 to discharge from its previously charged state. The triggering of the capacitor discharge SCR 139 extinguishes the preceding SCR to a battery stage, SCR 132 in this instance, while the next succeeding SCR is turned on. Such capacitor discharge is required for each step upwardly in the staircase when charging and also for each step downwardly in the staircase when discharging. From the sequence set by the ring counter, it will be observed that any possible capacitor discharge pulse is always preceded by a capacitor charge pulse from the preceding "on" stage of the ring counter to insure that the capacitor is fully charged. In the case of the battery charge circuit, the capacitor charge pulse from the preceding ring counter stage proceeds first through delay circuit 120 and then through AND gate 125 before capacitor charge SCR 128 is triggered. It will be observed that delay circuit 120 and current sensing circuit 235 are employed to insure that the capacitor 130 is entirely discharged prior to the triggering of SCR 128. When clutch 97 is engaged, prime mover 95 supplies power to both load 93 and to storage battery. As previously mentioned, the series arrangement of 60 c.p.s. generator (synchronous machine) 90 and 1.5 kc. parallel resonant circuit 112 produces a summation voltage closely approximating the staircase voltage generation required for charging. Hence, charging current is supplied to battery 100 via one of the pairs of main rectifying SCR's for one direction of flow (one-half cycle of charging current) and via the other pair of main rectifying SCR's for the other direction of current flow. The proper pair of rectifying SCR's is triggered to the conductive state by the "on" output of flip-flop 218, which in turn is determined by the operation of current sensing circuit 230. Assume further that charging current is flowing to storage battery 100 via circuit path completed by the triggering of SCR's 156 and 157. This implies that the outputs of flip-flops 218 and 213 associated with leads 225 and 220 respectively are "on," circuits 230 and 212 having supplied the trigger voltages to switch the flip-flops to this state in accordance with an operation to be described in detail presently and that charge AND gate 215 supplies the coincident pulse. An "on" output at lead 225 can produce an "on" output from only AND gate 215 (charge) or AND gate 216 (discharge), depending upon the state of flip-flop 213. But in this instance a charging current was assumed so that the state of flip-flop 213 must be such that the "on" output is at lead 220. Charging current is completed therefore through SCR 133 and diode 141. Assume, for example, that the instantaneous voltage is approximately eighty-two volts by the series connected battery stages 102 and 103. At the synchronous machine, the instantaneous voltage is about eighty-two volts and increasing sinusoidally. The difference between the voltage of the static inverter battery stages 102 and 103 and the synchronous machine voltage while stage 3 of the ring counter is "on" is the instantaneous voltage across the 1.5 kc. filter 112. At the conclusion of the "on" period for stage 3, the ring counter steps to stage four. This sequence continues at a 5 kc. rate until maximum voltage is reached. at which time one and one-half steps are required to reverse and step back down to zero. At zero voltage, the bistable multivibrator 213 changes state and, absent a current reversal in the current sensing circuit 230, the static inverter would change to the discharge mode. However, if unity power factor is assumed, a change of state occurs for both 213 and 218 coincident with zero voltage. The inverter continues to operate in the charge mode by swinging from charge AND gate 215 to charge AND gate 214 along with the switching of the main rectifying pairs of SCR's from 156 and 157 to 154 and 155. This switching back and forth continues every 1/120 of a second so long as the inverter continues to operate in the charge mode at unity power factor. The ring counter 117 and bistable multivibrator 213 insure that the charging SCR's 131–137 continue to be fired at the proper time and sequence to maintain the voltage output of the inverter phase-locked to the synchronous machine as though it were itself a synchronous machine. The amount of charging current to battery 100 from synchronous machine 90 is determined by the amount of torque applied to the synchronous machine by prime mover 95. Should this torque reverse and take motive power from the synchronous machine, the latter ceases operation as a generator and instantaneously begins operating at a motor, taking its power from the storage battery 100. At the moment of inversion, the current as sensed by current sensing circuit 230 would also invert and, if unity power factor is assumed, the current will be 180° out of phase with the voltage as under the charge mode. The bistable multivibrator 218, and switching of the main rectifying pairs of SCR's 154, 155 and 156, 157 will also shift phase with the voltage by 180° and the static inverter will operate in the discharge mode with switching back and forth between discharge AND gates 216 and 217. It should be noted here that OR gate 181, which turns on SCR 131 whenever it receives a pulse from AND gate 168 during charge mode operation, maintains SCR 131 on continuously during discharge mode operation. The action of SCR 131 during the discharge mode is therefore that of a diode, corresponding to the action of SCR 141 during the charge mode operation. Concurrently, the ring counter 117 maintains the proper firing time and sequence of discharge SCR's 141–147 through the discharge AND gates 185. In this manner, the transfer of power back and forth between synchronous machine 90 and the static inverter is the same as between any two synchronous machines.

The relationship between the 1.5 kc. frequency at which the pulse generator 110 is operating (and hence at which the ring counter and logic circuitry is operating) and the 60 c.p.s. frequency supplied by the synchronous machine is such that the voltage steps applied during battery charging will always result in charging of the appropriate stage or stages of the battery. The charging and discharging of capacitors 130 and 160 in the battery charge circuit and battery discharge circuit, respectively, follows the sequence previously discussed. Also, as described in connection with FIGURE 6 of copending application Ser. No. 547,328, current flow during the charge mode is always in a direction to charge the battery. In other words, during this mode of operation the static inverter converts the applied A.C. voltage to a D.C. voltage and thereby charges the battery, insuring that the full voltage of the several battery stages will be available when staircase waveform generating (battery discharge mode) by the inverter is required.

When clutch 97 is disengaged, the prime mover 95 is removed and all the power to the load is supplied by the battery. The effect of the discharge mode operation is, of course, an inversion of the D.C. voltage supplied by the battery to an A.C. voltage having a staircase waveform.

It should be emphasized that current may or may not flow immediately in main rectifying SCR pairs 154 and 155 or pair 156 and 157 when that pair is switched on. If only minute currents are flowing alternately to charge and discharge the battery current may not flow for several steps of the staircase voltage when flip-flop 218 switches from one state to the other. However, the flip-flop remains stable after being switched until current does flow, and when current returns to zero, circuit 230 will provide an output pulse to change the state of flip-flop 218. Flip-flop 213 on the other hand is switched every 1/120 of a second, or twice each cycle of 60 c.p.s. voltage.

It should also be emphasized that, in either the charge mode or the discharge mode, the static inverter may be required to operate at other than unity power factor. This means, in effect, that circuits 213 and 218 do not switch simultaneously and that the mode of operation momentarily reverts, at the end or beginning of each half cycle of 60 c.p.s. voltage depending upon whether the power factor is leading or lagging, to the opposite mode of operation. The results of this operation may be summarized as follows:

(1) When the 60 c.p.s. voltage passes through zero, and current through the static inverter continues to flow or remains at zero, the static inverter will switch from either the charge mode to the discharge mode or from the discharge mode to the charge mode;

(2) When current ceases to flow through the static inverter (i.e. SCR's 154 and 155 or 156 and 157 are conducting and revert to the blocking state when current goes to zero) and the 60 c.p.s. fundamental voltage is not at that moment passing through zero, the static inverter will switch from either the charge mode to the discharge mode or from the discharge mode to the charge mode;

(3) Should the 60 c.p.s. voltage pass through zero at the same time that current through the static inverter goes to zero (i.e. unity power factor) the static inverter will not change mode;

(4) The current through the static converter may take any direction, waveform, or magnitude commensurate with the circuit component ratings, and frequency of reversal from D.C. to 1.5 k.c.p.s. and all necessary switching to provide charging or discharging of the battery will automatically be performed by the circuit logic; while (5) The voltage at the load will be maintained sinusoidal at 60 c.p.s. with an RMS value dependent upon the terminal voltage of the battery plus (for charge) and minus (for discharge) the $I_{RMS}R$ dropped across the circuit components.

The static inverter of FIGURES 2a and 2b is, as previously stated, a preferred embodiment of unit 61 of the total energy system shown in FIGURE 1.

Returning now to FIGURE 1, the hot water in storage tank 10 may be circulated throughout the facility in which the energy system is located, for supplying heat and for other domestic purposes, in any conventional and convenient manner. For example, an additional circulating pump (not shown), which may be energized by a common wall mounted thermostat and electrically driven as a part of the electrical load on the energy system, is employed to circulate hot water from the top of tank 10 through baseboard radiators and back into the bottom inlet of the tank. As heat is supplied to the building, the interface 14 between hot and cold water in the tank is raised. Hot water may be supplied for domestic consumption, such as for kitchen, bathrooms, laundry, and so forth, by providing an additional storage tank (not shown) containing water which is heated through a heat exchanger from tank 10. This additional tank is supplied with cold water via a bottom inlet from the cold water supply of the facility, and hot water is drawn from a top outlet. Heat transfer from tank 10 to the additional tank is effected by a heat exchanger (not shown) through which water circulation is maintained, as necessary, by an associated pump. In this specific arrangement, which is completely conventional, there is no actual interchange of water between the two tanks, but only a transfer of heat via the heat exchanger.

It will be apparent, with reference to storage tank 10, that an expansion tank is normally located above that tank to allow solely for differential expansion and contraction of the stored water as a result of temperature changes.

While I have disclosed a preferred embodiment of my invention, it will be apparent that variations of the specific details of construction which have been illustrated and described may be resorted to without departing from the spirit and scope of the invention, as defined in the appended claims.

I claim:

1. A total energy system for operation in conjunction with one or more of the heating, water storage, and air conditioning units of the establishment in which the system is to be installed, and for supplying the electrical power requirements of the electrical load presented to the system by said establishment, said total energy system including a prime mover; an alternating current generator; a static inverter for converting AC to DC and for converting DC to AC; a plurality of storage batteries connected to said inverter to receive direct current therefrom as battery charging current and for supplying direct current to said inverter for conversion to alternating current; means connecting said generator in parallel circuit with said inverter and said load for applying the alternating current output of said generator to said inverter, to charge said batteries, and to said load and for applying the alternating current output of said inverter, resulting from the discharge of said batteries, to said load; first sensing means for detecting the level of charge on said batteries and for generating voltages indicative thereof; second sensing means for detecting the power demand of said load and for generating voltages indicative thereof; third sensing means for detecting the temperature of water stored in said water storage unit and for generating voltages indicative thereof; means for starting said prime mover and for controlling the supply of fuel thereto; means coupling said generator to said prime mover for driving said generator during time intervals in which said prime mover is operating; a pump coupled to said prime mover for operation therewith; pipe means coupling said pump to the cold and hot water return lines of said water storage unit; means coupled to said prime mover and to said pipe means for transferring heat resulting from the operation of said prime mover to the water flowing through said pipe means; and means responsive to voltages generated by one or more of said sensing means for controlling the operation of said prime mover, whereby to control the application of electrical power to said load and to control the levels of energy stored in said battery and water storage units.

2. The system according to claim 1 wherein said prime mover comprises an internal combustion engine; said means for transferring heat including an exhaust manifold and a water jacket for said engine, and a heat exchanger; said water jacket having an inlet for receiving cold water flowing through said pipe means and an outlet for transferring water heated upon passage through said water jacket to said hot water return line; said heat exchanger coupled to said exhaust manifold and to said pipe means for applying to the water flowing through said pipe means the heat generated by the combustion products exhausted from said engine via said exhaust manifold.

3. The system according to claim 2 further including an electrical resistance heating element disposed in said water jacket, and a switch for selectively connecting said heating element to said generator for application of current produced by said generator to said heating element, said switch responsive to voltages generated by said first sensing means to provide a current path therethrough to said heating element when said batteries are substantially fully charged.

4. The system according to claim 3 wherein is further included a thermo-electric transducer for sensing the temperature of water flowing through said water jacket and for generating a voltage when said water temperature exceeds a predetermined maximum acceptable value; an exhaust pipe; and valve means in said pipe means and operative in response to the voltage generated by said transducer to divert the flow of hot water from said pipe means to said exhaust pipe.

5. The system according to claim 1 wherein said means for controlling the operation of said prime mover includes a plurality of AND and OR gates for exercising logical control over the starting, stopping, and period of operation of said prime mover in accordance with binary voltages generated by said sensing means.

6. The system according to claim 1 wherein said storage batteries are series connected; and wherein said static inverter comprises a first plurality of normally non-conductive unidirectional current switches, means coupling each of said switches to said batteries and to said power source to connect a distinct and different group of said series-connected batteries across the output terminals of said power source via each switch, when rendered conductive, means for selectively and sequentially rendering each of said switches conductive as the output voltage of said power source exceeds the voltage of the group of series-connected batteries respectively associated therewith, for application of D.C. charging current to that group of batteries, a further plurality of normally non-conductive unidirectional current switches, means coupling each of said further plurality of said switches to said batteries and to said load to connect a distinct and different group of said series-connected batteries across said load via each further switch, when rendered conductive, and further means for selectively and sequentially rendering each of said further plurality of switches conductive to apply the output voltages from said groups of batteries to said load in the form of a staircase A.C. voltage.

7. A total energy system for operation in conjunction with existing air conditioning, heating and water storage units at the facility or establishment in which the system is to be installed, and for supplying the electrical power requirements of the load presented by the facility, said system including a prime mover; an A.C. generator; a static inverter for converting A.C. to D.C. and D.C. to A.C.; a plurality of storage batteries connected to the inverter to receive D.C. charging current therefrom, and to supply stored D.C. voltages thereto for conversion to an A.C. voltage; means connecting the generator, inverter and load in parallel circuit so that the A.C. output of the generator is applied to the inverter to charge the batteries, and to the load, and the A.C. voltage derived by the inverter from the storage batteries is supplied to the load during peak power requirements and periods when the prime mover is idle; a plurality of sensors for detecting level of charge on the storage batteries, power demand of the load, and temperature of water contained in the water storage unit, each sensor generating a voltage indicative of the respective detected parameter; means for starting the prime mover and for controlling the supply of fuel thereto; drive means for selectively coupling the generator to the prime mover for application of driving power to the generator during operation of the prime mover; a conduit system for carrying hot and cold water to and from the water storage unit; means in the conduit system for pumping the water carried thereby; means for transferring heat resulting from the operation of the prime mover to water flowing through the conduit system; and a logic circuit responsive to voltages generated by the sensors for controlling the operation of the prime mover.

References Cited

UNITED STATES PATENTS

| | | | |
|---|---|---|---|
| 2,697,174 | 12/1954 | Stivender | 290—40 XR |
| 2,953,691 | 9/1960 | Rapp | 290—40 XR |
| 3,325,650 | 6/1967 | Barnes | 290—40 |

ORIS L. RADER, *Primary Examiner.*

G. SIMMONS, *Assistant Examiner.*

U.S. Cl. X.R.

320—043